(12) United States Patent
Itou

(10) Patent No.: US 12,276,330 B2
(45) Date of Patent: Apr. 15, 2025

(54) OIL DISCHARGE STRUCTURE

(71) Applicants: JATCO Ltd, Fuji (JP); NISSAN MOTOR CO., LTD., Yokohama (JP)

(72) Inventor: Tsutomu Itou, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/042,336

(22) PCT Filed: Oct. 20, 2021

(86) PCT No.: PCT/JP2021/038733
§ 371 (c)(1),
(2) Date: Feb. 21, 2023

(87) PCT Pub. No.: WO2022/097474
PCT Pub. Date: May 12, 2022

(65) Prior Publication Data
US 2024/0026964 A1 Jan. 25, 2024

(30) Foreign Application Priority Data
Nov. 5, 2020 (JP) ................... 2020-184946

(51) Int. Cl.
*F16H 57/04* (2010.01)
*F01M 11/00* (2006.01)
*F01M 11/04* (2006.01)

(52) U.S. Cl.
CPC ..... *F16H 57/0408* (2013.01); *F01M 11/0004* (2013.01); *F01M 11/0408* (2013.01); *F01M 11/0458* (2013.01); *F01M 2011/0033* (2013.01); *F01M 2011/0433* (2013.01)

(58) Field of Classification Search
CPC ............... F16H 57/0408; F01M 11/04; F01M 11/0408; F01M 11/0458; F01M 2011/0033; F01M 2011/0416; F01M 2011/0425; F01M 2011/0433; F01M 2011/0466; F16N 19/006
See application file for complete search history.

(56) References Cited

U.S. PATENT DOCUMENTS

| | | | | |
|---|---|---|---|---|
| 1,421,995 A | * | 7/1922 | Rowan | F16N 19/006 184/103.2 |
| 1,548,222 A | * | 8/1925 | Spreen | F16N 19/006 119/77 |
| 1,912,190 A | * | 5/1933 | Goldberg | F01M 1/10 184/6.5 |
| 3,625,310 A | * | 12/1971 | Herrick | F16N 19/003 184/6.12 |

(Continued)

FOREIGN PATENT DOCUMENTS

| JP | H04-127822 U | 11/1992 |
|---|---|---|
| JP | H11-173133 A | 6/1999 |

(Continued)

*Primary Examiner* — Minh Truong
(74) *Attorney, Agent, or Firm* — Foley & Lardner LLP

(57) ABSTRACT

An apparatus includes a case that stores oil inside, wherein the case includes a drain hole that discharges the oil to an outside, and a tubular portion that protrudes in a direction intersecting a direction of gravity, and the drain hole opens in a direction intersecting the direction of gravity on the tubular portion.

3 Claims, 3 Drawing Sheets

(56) References Cited

U.S. PATENT DOCUMENTS

| | | | | |
|---|---|---|---|---|
| 4,589,524 | A | * | 5/1986 | Laycock ................ F01M 11/04 |
| | | | | 184/103.1 |
| 5,806,472 | A | * | 9/1998 | Nelson ............... F01M 11/0458 |
| | | | | 123/73 AD |
| 10,514,107 | B2 | * | 12/2019 | Stachowiak ........... F01M 11/04 |
| 2006/0196575 | A1 | | 9/2006 | Nakamura et al. |
| 2016/0061312 | A1 | * | 3/2016 | Aldrich ............... F16H 57/0408 |
| | | | | 74/606 R |
| 2021/0131321 | A1 | * | 5/2021 | Tomescu ................... F16N 7/40 |
| 2021/0245891 | A1 | * | 8/2021 | Coupard ................ F01M 11/10 |

FOREIGN PATENT DOCUMENTS

| | | | |
|---|---|---|---|
| JP | 2003-214130 | A | 7/2003 |
| JP | 2006-242365 | A | 9/2006 |
| JP | 2008-014372 | A | 1/2008 |
| JP | 2009-293734 | A | 12/2009 |
| JP | 2010-255761 | A | 11/2010 |
| JP | 2015-105702 | A | 6/2015 |
| JP | 2017001677 | A * | 1/2017 |
| JP | 2017-206304 | A | 11/2017 |
| KR | 100737024 | B1 * | 7/2007 |

* cited by examiner

OIL DISCHARGE STRUCTURE

TECHNICAL FIELD

The present invention relates to an apparatus.

BACKGROUND ART

Patent Document 1 discloses a transmission in which a tubular member that communicates between an inside and an outside of a housing is provided in a lower part of the housing, protruding upward.

In the above transmission, when changing oil, surplus oil among new oil supplied to the housing is discharged to the outside through the tubular member. Thus, the amount of the oil in the housing is adjusted to a specified amount.

Similarly, in order to adjust the amount of the oil to the specified amount, a drain hole may be formed on the case itself of the transmission.

PRIOR ART DOCUMENT

Patent Document
Patent Document 1: JP 2008-14372A

SUMMARY OF INVENTION

By the way, there is a known method that at the time of changing oil in a transmission, new oil is supplied to the transmission in a state where a driving source connected to the transmission is in operation. According to this method, since the transmission can be operated by a driving force from the driving source, the new oil can be circulated in the transmission and distributed to each part.

However, in the above-described oil changing method, the oil is circulated in the transmission, causing a carried up oil to flow down from above. Therefore, when a drain hole for adjusting the amount of the oil to a specified amount is formed on a case itself of the transmission, there is a possibility that the oil flowing down from above flows directly into the drain hole along a wall face of the case and continues to be discharged even when the amount of the oil falls below the specified amount. In such a case, it is difficult to appropriately adjust the amount of the oil.

The present invention has been made in view of such technical problem, and has an object to enable easy adjustment of the amount of the oil.

According to one aspect of the present invention, an apparatus includes a case that stores oil inside, wherein the case includes a drain hole that discharges the oil to an outside, and a tubular portion that protrudes in a direction intersecting a direction of gravity, and the drain hole opens in a direction intersecting the direction of gravity on the tubular portion.

According to another aspect of the present invention, an apparatus includes a case that stores oil inside, wherein the case includes a drain hole that discharges the oil to an outside, a tubular portion that protrudes in a direction intersecting a direction of gravity, and a rib that is provided on a top of the tubular portion, and the drain hole opens in a direction opposite to the direction of gravity on the tubular portion.

In these aspects, it is difficult for the oil flowing down from above to flow into the drain hole. Therefore, at the time of changing the oil, when the amount of the oil decreases to the specified amount due to surplus oil being discharged from the drain hole, a discharge of the oil from the drain hole is suppressed. This facilitates determination as to whether the amount of the oil in the case has reached the specified amount, and therefore allows for easy adjustment of the amount of the oil.

DESCRIPTION OF EMBODIMENTS

Hereinafter, an automatic transmission 100 as an apparatus according to an embodiment of the present invention will be described with reference to the accompanying drawings. Note that a solid-line arrow G shown in each drawing indicates a direction of gravity.

Figure 1:
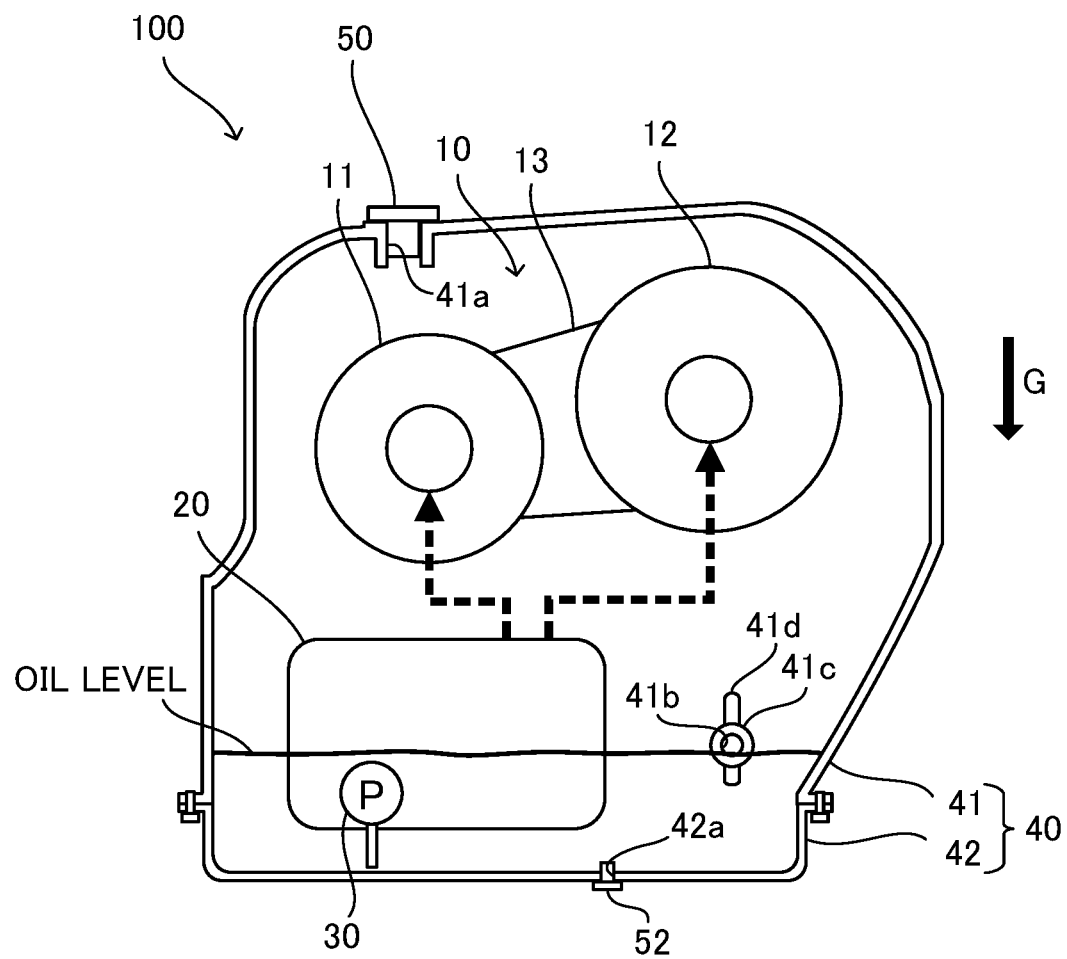
FIG. 1 is a side cross-sectional view schematically showing an automatic transmission according to an embodiment of the present invention.

FIG. 1 is a side cross-sectional view schematically showing an automatic transmission 100 according to an embodiment of the present invention.

As shown in FIG. 1, the automatic transmission 100 includes a transmission mechanism 10, a valve body 20, an oil pump 30, and others, and a case 40 that houses them.

The transmission mechanism 10 is a continuously variable transmission mechanism including a primary pulley 11, a secondary pulley 12, and a belt 13. In the transmission mechanism 10, a hydraulic pressure supplied from the valve body 20 to the primary pulley 11 and the hydraulic pressure supplied from the valve body 20 to the secondary pulley 12 are controlled to change groove widths of the pulleys 11, 12 so as to change the contact radius with the belt 13, thereby changing a speed ratio.

The valve body 20 includes a plurality of flow paths and a plurality of hydraulic pressure control valves. According to a shift control signal from a controller (not shown), the valve body 20 controls the plurality of the hydraulic pressure control valves to switch a supply path of the hydraulic pressure, and adjusts a required line pressure from the hydraulic pressure generated by the oil pump 30 and supplies the adjusted line pressure to each part of the automatic transmission 100.

The oil pump 30 is a mechanical oil pump driven by a driving force from a driving source (not shown) connected to the automatic transmission 100. The driving source may be an engine, a motor, or others.

The case 40 includes a main body portion 41 and an oil pan 42 attached to a lower side of the main body portion 41. The case 40 stores the oil inside.

At the bottom of the oil pan 42, a drain hole 42a is provided for draining the oil to an outside. The drain hole 42a is closed by a drain bolt 52 in a normal state.

At a top of the main body portion 41, an oil supply port 41a is provided. The supply port 41a is closed by a cap 50 in the normal state. In addition, at a bottom of the main body portion 41, the drain hole 41b is provided for draining the oil to the outside. The drain hole 41b is closed by the drain bolt 51 in the normal state (see FIG. 3).

As shown in FIG. 1, the drain hole 41b is provided at a position where the amount of the oil stored in the case 40 up to the height of the drain hole 41b is a specified amount for the automatic transmission 100, and the drain hole 41b is used for adjusting the amount of the oil to the specified amount at the time of oil change.

Hereinafter, a method for changing the oil in the automatic transmission 100 will be described.

When changing the oil, first, the drain bolt 52 is removed to discharge old oil from the drain hole 42a. After the old oil is discharged, the drain bolt 52 is attached to the drain hole 42a.

Next, the drain bolt 51 is removed from the drain hole 41b, and new oil is supplied from the oil supply port 41a into the case 40 in an amount larger than the specified amount.

Here, in the present embodiment, the new oil is supplied to the case under the condition that the driving source is run to drive the oil pump 30 of the automatic transmission 100.

As a result, the new oil accumulated in the oil pan 42 is pumped up by the oil pump 30 and supplied to each part of the automatic transmission 100 via the valve body 20. That is, by running the driving source while supplying the new oil to the case 40, it is possible to circulate the new oil in the automatic transmission 100 and distribute the new oil to each part.

Then, as the new oil accumulates in the case 40, surplus oil exceeding the specified amount is discharged from the drain hole 41b.

By the way, when running the driving source to circulate the oil in the automatic transmission 100 while supplying the new oil to the case 40, a carried up oil flows down from above.

When the oil flowing down from above flows along a wall face of the case 40 directly into the drain hole 41b, there is a concern that the oil continues to be discharged even when the amount of the oil in the case 40 falls below the specified amount, resulting in difficulty in determining as to whether the amount of the oil has reached the specified amount.

In contrast, in the automatic transmission 100 of the present embodiment, the periphery of the drain hole 41b is configured such that the oil flowing down from above is difficult to flow into the drain hole 41b. In other words, it is designed such that the discharge of the oil from the drain hole 41b is suppressed when the amount of the oil in the case 40 is reduced to the specified amount. This facilitates determination as to whether the amount of the oil in the case 40 has reached the specified amount, and allows for easy adjustment of the amount of the oil.

Hereinafter, a configuration of the periphery of the drain hole 41b will be described in detail with reference to FIGS. 2 and 3.

Figure 2:
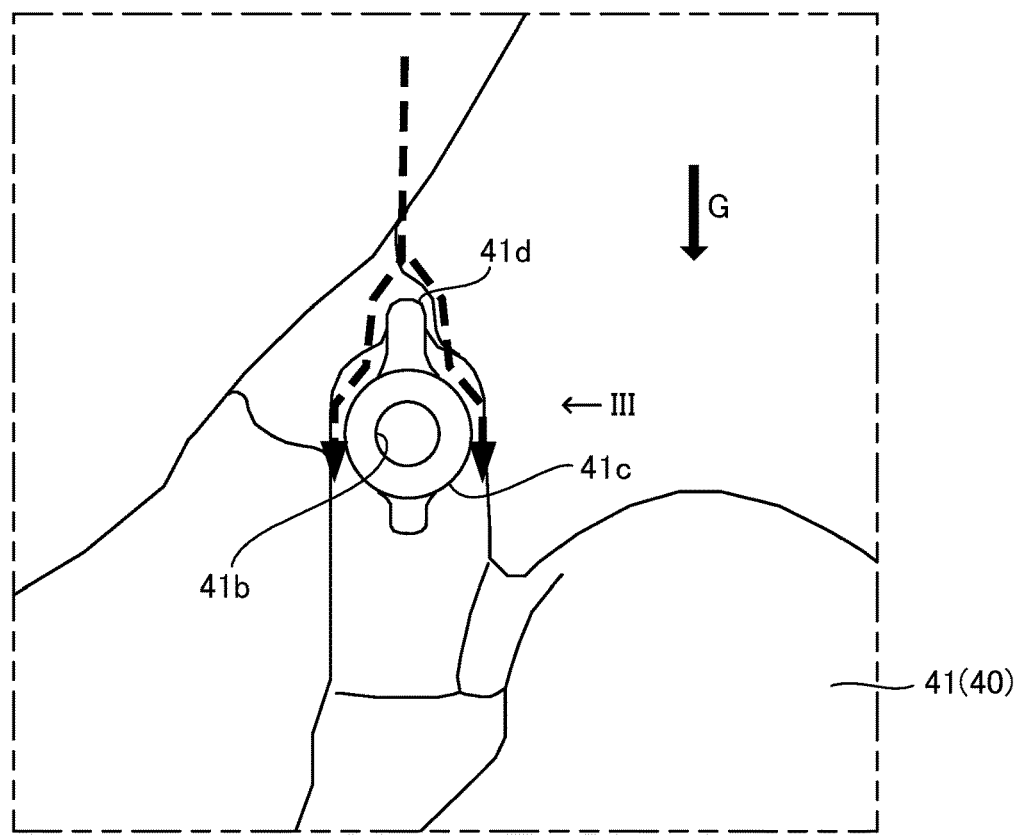
FIG. 2 is an enlarged view showing a periphery of a drain hole in FIG. 1.

FIG. 2 is an enlarged view showing a periphery of the drain hole 41b in FIG. 1. FIG. 3 is a partial cross-sectional view showing the periphery of the drain hole 41b viewed from a direction of an arrow III in FIG. 2. Dashed arrows in FIGS. 2 and 3 indicate a flow of the oil flowing down from above.

Figure 3:
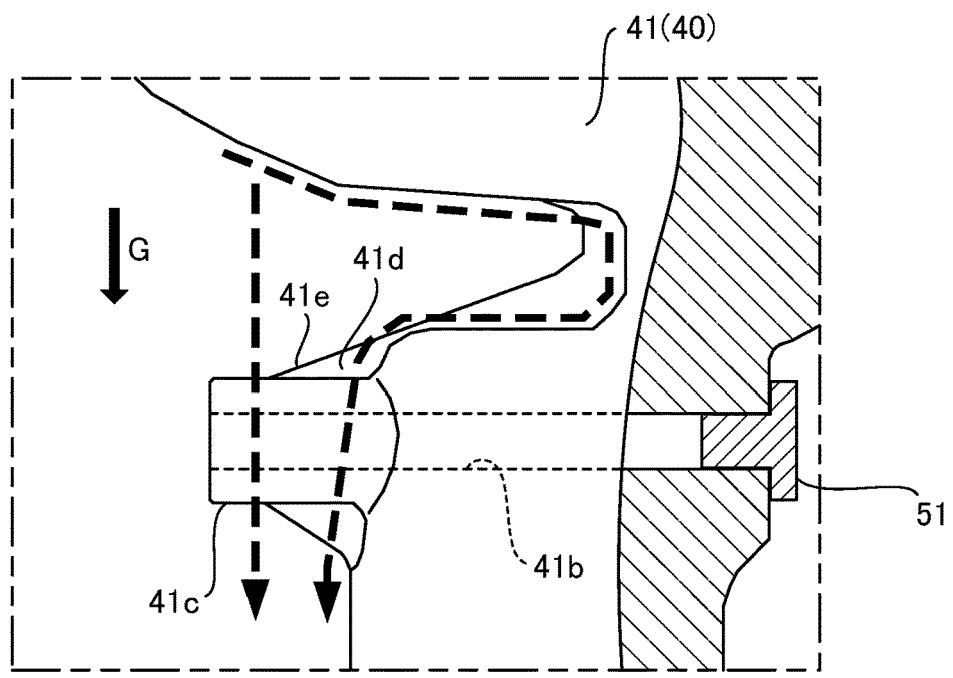
FIG. 3 is a partial cross-sectional view showing the periphery of the drain hole viewed from a direction of an arrow III in FIG. 2.

As shown in FIGS. 2 and 3, the main body portion 41 of the case 40 is provided with a tubular portion 41c that protrudes in a direction orthogonal to a direction of gravity.

The drain hole 41b opens on an end face of the tubular portion 41c. In other words, the drain hole 41b opens on the tubular portion 41c in a direction in which the tubular portion 41c protrudes (direction orthogonal to the direction of gravity).

In this way, as shown in FIG. 3, the oil flowing down along the wall face of the case 40 flows downward through the vicinity of the base end of the tubular portion 41c. Also, the oil dripping from the wall face of the case 40 onto the tubular portion 41c flows downward along the outer peripheral face of the tubular portion 41c. Therefore, it is difficult for the oil flowing down from above to flow into the drain hole 41b.

Note that the direction in which the tubular portion 41c protrudes and the direction in which the drain hole 41b opens are not limited to the direction orthogonal to the direction of gravity. As long as the direction in which the tubular portion 41c protrudes and the direction in which the drain hole 41b opens intersects the direction of gravity, even slightly, the above effect can be achieved.

When the direction in which the tubular portion 41c protrudes and the direction in which the drain hole 41b opens is orthogonal to the direction of gravity, it is easier to integrally mold them with the main body portion 41 by casting.

Note that the tubular portion 41c may be formed integrally with the main body portion 41 or may be formed separately from the main body portion 41.

Further, in the present embodiment, a rib 41d is provided on a top of the tubular portion 41c. As shown in FIG. 2, the rib 41d protrudes upward (direction opposite to the direction of gravity), and as shown in FIG. 3, the rib 41d extends along an axial direction of the tubular portion 41c.

When the rib 41d is not provided, depending on the amount and momentum of the oil flowing down, the oil may flow over a top face of the tubular portion 41c and reach the end face of the tubular portion 41c where the drain hole 41b opens.

In contrast, when the 41d rib is provided, as shown in FIG. 2, the oil flowing down from above comes into contact with the apex of the rib 41d and is split to both sides of the rib 41d. Then, the oil split to both sides of the rib 41d flows downward along the outer peripheral face of the tubular portion 41c as it is. Therefore, it becomes difficult for the oil to reach the end face of the tubular portion 41c, and the oil can be prevented from flowing into the drain hole 41b. Note that the rib 41d may be formed integrally with the main body portion 41 or may be formed separately from the main body portion 41.

The rib 41d includes a sloping portion 41e whose height decreases toward the end face side of the tubular portion 41c.

This allows molten metal to flow smoothly during casting and facilitates filling the molten metal to corners of the rib 41d. The sloping portion 41e may not necessarily be provided. That is, the height of the rib 41d may be the same throughout the entire area.

Next, a modification of the automatic transmission 100 will be described with reference to FIG. 4. The dashed arrow in FIG. 4 indicates the flow of the oil flowing down from above.

Figure 4:
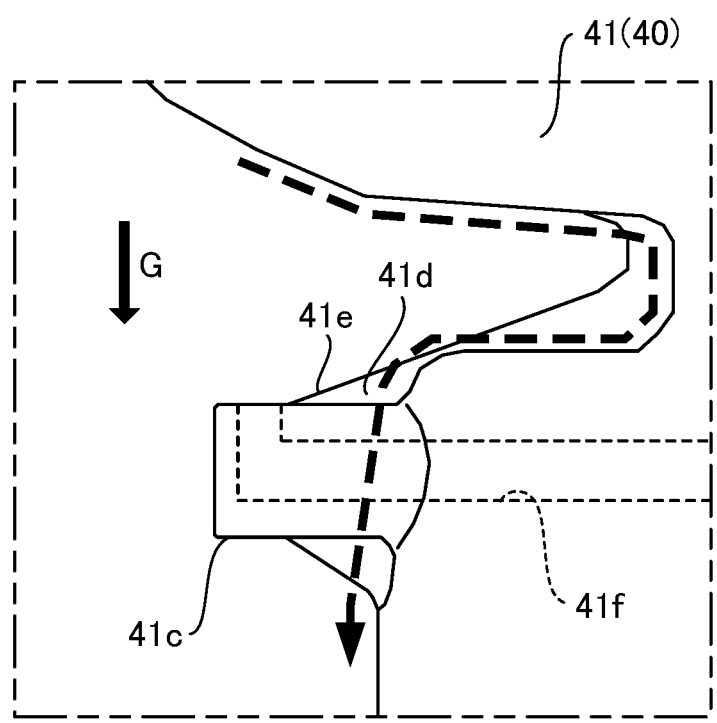
FIG. 4 is a view for describing a modification of the automatic transmission.

In a modification of the automatic transmission 100, as shown in FIG. 4, the drain hole 41f that discharges the oil to the outside is opened in the direction opposite to the direction of gravity on the tubular portion 41c. Other configurations are the same as those in the automatic transmission 100.

Also in this case, by providing the rib 41d on the top of the tubular portion 41c, it is difficult for the oil flowing down along the wall face of the case 40 to reach the drain hole 41f. That is, by providing the rib 41d, it is possible to suppress the oil from flowing into the drain hole 41f regardless of the direction in which drain hole 41f opens.

Major actions and effects of the automatic transmission 100 configured as described above will be collectively described.

(1) The automatic transmission 100 includes the case 40 that stores the oil inside, wherein the case 40 has the drain hole 41b that discharges the oil to the outside and the tubular portion 41c that protrudes in the direction intersecting the direction of gravity, wherein the drain hole 41b opens in the direction intersecting the direction of gravity on the tubular portion 41c.

This allows the oil flowing down along the wall face of the case 40 to flow downward through the vicinity of the base end of the tubular portion 41c. Also, the oil dripping from the wall face of the case 40 onto the tubular portion 41c flows downward along the outer peripheral face of the tubular portion 41c. Therefore, it is difficult for the oil flowing down from above to flow into the drain hole 41b. Therefore, at the time of changing the oil, when the amount of the oil decreases to the specified amount due to the surplus oil being discharged from the drain hole 41b, the discharge of the oil from the drain hole 41b is suppressed. This facilitates determination as to whether the amount of the oil in the case 40 has reached the specified amount, and therefore allows for easy adjustment of the amount of the oil.

(2) The case 40 includes the rib 41d provided on the top of the tubular portion 41c.

This allows the oil flowing down from above to come into contact with the apex of the rib 41d and to be split to both sides of the rib 41d. Then, the oil split to both sides of the rib 41d flows downward along the outer peripheral face of the tubular portion 41c as it is. Therefore, it becomes difficult for the oil to reach the drain hole 41b, and the oil can be prevented from flowing into the drain hole 41b.

(3) The automatic transmission 100 according to the modification includes the case 40 that stores the oil inside, wherein the case 40 has the drain hole 41f that discharges the oil to the outside, the tubular portion 41c that protrudes in the direction intersecting the direction of gravity, and the rib 41d that is provided on the top of the tubular portion 41c, wherein the drain hole 41f opens in the direction opposite to the direction of gravity on the tubular portion 41c.

This allows the oil flowing down from above to come into contact with the apex of the rib 41d and to be split to both sides of the rib 41d. Then, the oil split to both sides of the rib 41d flows downward along the outer peripheral face of the tubular portion 41c as it is. Therefore, it becomes difficult for the oil to reach the drain hole 41f. That is, by providing the rib 41d, it is possible to suppress the oil from flowing into the drain hole 41f regardless of the direction in which drain hole 41f opens.

(4) The rib 41d includes the sloping portion 41e.

This allows molten metal to flow smoothly during casting and facilitates filling the molten metal to corners of the rib 41d.

While an embodiment of the invention has been described, the embodiment is merely one of application examples of the invention, and does not intend to limit a technical scope of the invention to a specific configuration according to the embodiment.

For example, the above embodiment describes a case where the apparatus is the automatic transmission 100. However, the apparatus may be, for example, a power transmission device. The power transmission device is a device that contributes to transmission of power, and is, for example, a device including a transmission, a reduction gear, or others.

The above embodiment describes a case where the oil pump 30 is a mechanical oil pump and is driven by the driving source to change the oil. However, in the case where the apparatus includes an electric oil pump, the oil can be changed while supplying power to drive the electric oil pump. In such a case, the present invention also facilitates determination as to whether the amount of the oil in the apparatus has reached the specified amount, and therefore allows for easy adjustment of the amount of the oil.

In the above embodiment, the drain holes 41b and 41f for adjusting the amount of the oil are provided on the main body portion 41 of the case 40. However, depending on the size of the oil pan and the specified amount of the oil, the drain hole for adjusting the amount of the oil may be provided on the oil pan.

The present application claims a priority of Japanese Patent Application No. 2020-184946 filed with the Japan Patent Office on Nov. 5, 2020, all the contents of which are hereby incorporated by reference.

DESCRIPTION OF REFERENCE SIGNS

100 Automatic transmission (apparatus)
40 Case
41b Drain hole
41c Tubular portion
41d Rib
41e Sloping portion
41f Drain hole

The invention claimed is:

1. An apparatus comprising:
a case that stores oil inside, wherein
the case includes a drain hole that is provided at a position where an amount of the oil reaches a specified amount for the apparatus to operate, after the oil has been discharged from the drain hole to an outside, and a tubular portion that is provided on an inside wall face of the case, the inside wall face being along a direction of gravity, and protrudes in a direction orthogonal to the direction of gravity,
when the amount of the oil reaches the specified amount, an oil level of the oil is located above an inlet of an oil pump that pumps up the oil stored in the case,
the drain hole opens in a direction intersecting the direction of gravity on the tubular portion,
the case includes a rib that is provided on a top of the tubular portion, the rib being protrude toward a direction opposite to the direction of gravity and extend along an axial direction of the tubular portion, and
inside the case, the oil pump supplies the oil to a transmission mechanism located above the tubular portion.

2. The apparatus according to claim 1, wherein the rib includes a sloping portion.

3. An apparatus comprising:
a case that stores oil inside, wherein
the case includes a drain hole that is provided at a position where an amount of the oil reaches a specified amount for the apparatus to operate, after the oil has been discharged from the drain hole to an outside, a tubular portion that is provided on an inside wall face of the case and protrudes in a direction intersecting a direction of gravity, and a rib that is provided on a top of the tubular portion,
when the amount of the oil reaches the specified amount, an oil level of the oil is located above an inlet of an oil pump that pumps up the oil stored in the case, and
the drain hole opens in a direction opposite to the direction of gravity on an outer circumferential surface of the tubular portion.

* * * * *